(12) United States Patent
Choi et al.

(10) Patent No.: US 8,838,128 B2
(45) Date of Patent: *Sep. 16, 2014

(54) COMBINED BASE TRANSCEIVER STATION AND BASE STATION CONTROLLER CALL ORIGINATION AND TERMINATION

(71) Applicant: Ubeeairwalk, Inc., Jhubei (TW)

(72) Inventors: Myoung Chul Choi, Plano, TX (US); Hyunyung Cha, Plano, TX (US); Hyeon Bong Park, Plano, TX (US); Jae Kyu Yoo, Richardson, TX (US)

(73) Assignee: Ubeeairwalk, Inc. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/916,026

(22) Filed: Jun. 12, 2013

(65) Prior Publication Data

US 2013/0316717 A1 Nov. 28, 2013

Related U.S. Application Data

(63) Continuation of application No. 12/632,920, filed on Dec. 8, 2009, now Pat. No. 8,472,964, which is a continuation of application No. 11/037,813, filed on Jan. 18, 2005, now Pat. No. 7,647,054.

(60) Provisional application No. 60/537,408, filed on Jan. 16, 2004, provisional application No. 60/537,419, filed on Jan. 16, 2004.

(51) Int. Cl.
*H04W 72/00* (2009.01)

(52) U.S. Cl.
USPC .................................. 455/450; 455/561

(58) Field of Classification Search
USPC .................................... 455/450, 561
See application file for complete search history.

(56) References Cited

U.S. PATENT DOCUMENTS

| | | | | |
|---|---|---|---|---|
| 2002/0057653 | A1* | 5/2002 | Dolan et al. | 370/252 |
| 2003/0063583 | A1* | 4/2003 | Padovani et al. | 370/329 |
| 2003/0119518 | A1* | 6/2003 | Cleveland et al. | 455/450 |
| 2003/0129988 | A1* | 7/2003 | Lee et al. | 455/450 |

* cited by examiner

*Primary Examiner* — Ariel Balaoing

(57) ABSTRACT

A system, method, and computer readable medium for a mobile origination comprises receiving an origination request message by a main call control (MCC) from a radio call control (RCC), receiving an assignment request message by the RCC from the MCC, receiving a traffic channel assign message by a channel element control (CEC) and by the MCC from the RCC, receiving a call setup message by a selector distribution unit (SDU) from the MCC, and receiving a link active message by the CEC from the SDU.

20 Claims, 7 Drawing Sheets

COMBINED BASE TRANSCEIVER STATION AND BASE STATION CONTROLLER CALL ORIGINATION AND TERMINATION

CROSS REFERENCE TO RELATED APPLICATIONS

The present patent application is a continuation of and claims priority from patent application Ser. No. 12/632,920, filed on Dec. 8, 2009 and titled COMBINED BASE TRANSCEIVER STATION AND BASE STATION CONTROLLER CALL ORIGINATION AND TERMINATION, now issued U.S. Pat. No. 8,472,964, issued on Jun. 25, 2013, which is a continuation of application Ser. No. 11/037,813, filed on Jan. 18, 2005 and titled COMBINED BASE TRANSCEIVER STATION AND BASE STATION CONTROLLER CALL ORIGINATION AND TERMINATION, now issued U.S. Pat. No. 7,647,054, issued on Jan. 12, 2010, which in turn claims the benefit of provisional patent application No. 60/537,408, filed on Jan. 16, 2004, entitled CDMA Radio Access Network System and Method, and provisional patent application No. 60/537,419, filed on Jan. 16, 2004, entitled CDMA IP Base Transceiver Station, the contents of which are enclosed by reference herein. The present patent application is further related to patent application Ser. No. 11/037,063, entitled COMBINED BASE TRANSCEIVER STATION AND BASE STATION CONTROLLER, now issued U.S. Pat. No. 8,060,143, issued on Nov. 15, 2011, application Ser. No. 11/037,814 entitled COMBINED BASE TRANSCEIVER STATION AND BASE STATION CONTROLLER HANDOFF, now issued U.S. Pat. No. 8,019,348, issued on Sep. 13, 2011, application Ser. No. 11/037,386 entitled COMBINED BASE TRANSCEIVER STATION AND BASE STATION CONTROLLER DATA CALL, now issued U.S. Pat. No. 7,509,128, issued on Mar. 24, 2009, application Ser. No. 11/037,387 entitled COMBINED BASE TRANSCEIVER STATION AND BASE STATION CONTROLLER DATA CALL AND QUALITY OF SERVICE, now issued U.S. Pat. No. 7,643,449, issued on Jan. 5, 2010, and patent application Ser. No. 11/037,388 entitled COMBINED BASE TRANSCEIVER STATION AND BASE STATION CONTROLLER OPTIMIZED ASSIGNMENT OF FRAME OFFSETS, now issued U.S. Pat. No. 8,090,370, issued on Jan. 3, 2012, each of which is assigned to the assignee of the present invention.

BACKGROUND OF THE INVENTION

The present invention is related to a base transceiver station and a base station controller, and, more specifically to a combined base transceiver station and a base station controller.

Current cellular operators predominantly provide services via very large or macro coverage areas. Limitations encountered by these operators include the difficulty of providing reliable in-building or campus coverage. Such coverage should provide subscribers with seamless services at a particular quality level, and should provide operators with additional revenue sources.

Therefore, what is needed is a wireless solution that overcomes the aforementioned limitations by providing a micro solution that compliments the wireless macro network by providing increased voice and data capacity and coverage.

SUMMARY OF THE INVENTION

The present invention provides a radio access network (RAN) system (which contains a base transceiver station and a base station controller integrated into a single compact platform) for wireless coverage and in-building services, as well as for providing additional capacity in a macro network when it comes to filling "hotspots." Such a RAN system, which preferably operates in or in conjunction with a CDMA network, supports signaling, traffic, handoff, power, and control, while providing multiple interfaces to the core network.

In one embodiment, a method for a mobile origination comprises receiving an origination request message by a main call control (MCC) from a radio call control (RCC), receiving an assignment request message by the RCC from the MCC, receiving a traffic channel assign message by a channel element control (CEC) and by the MCC from the RCC, receiving a call setup message by a selector distribution unit (SDU) from the MCC, and receiving a link active message by the CEC from the SDU.

In another embodiment, a method for a mobile origination comprises receiving an origination request message by a base station controller (BSC) from a base transceiver station (BTS), wherein the BSC and the BTS are co-located, receiving an assignment request message by the BTS from the BSC, receiving a traffic channel assign message by the BTS and the BSC, receiving a call setup message by the BSC from the BSC, and receiving a link active message by the BTS from the BSC.

In a further embodiment, a combined base station controller (BSC) and base transceiver station (BTS) system for mobile origination comprises the BSC adapted to receive an origination request message, the BTS adapted to receive an assignment request message, the BTS and the BSC adapted to receive a traffic channel assign message, the BSC adapted to receive a call setup message, and the BTS adapted to receive a link active message.

In yet another embodiment, a computer readable medium comprises instructions for: receiving mobile station identification information by a first module, allocating radio resources by a second module, assigning forward and reverse traffic channel elements by the first module, receiving mobile station information and initialization information by the second module, and indicating a link between the first module and the second module has been established.

In yet a further embodiment, a method for a mobile termination comprises receiving a paging request message by a radio call control (RCC) from a main call control (MCC), receiving a page response message by the RCC and by the MCC, receiving an assignment request message by the MCC and by the RCC, and receiving a traffic channel assign message by a channel element control (CEC).

DETAILED DESCRIPTION OF THE INVENTION

Figure 1:
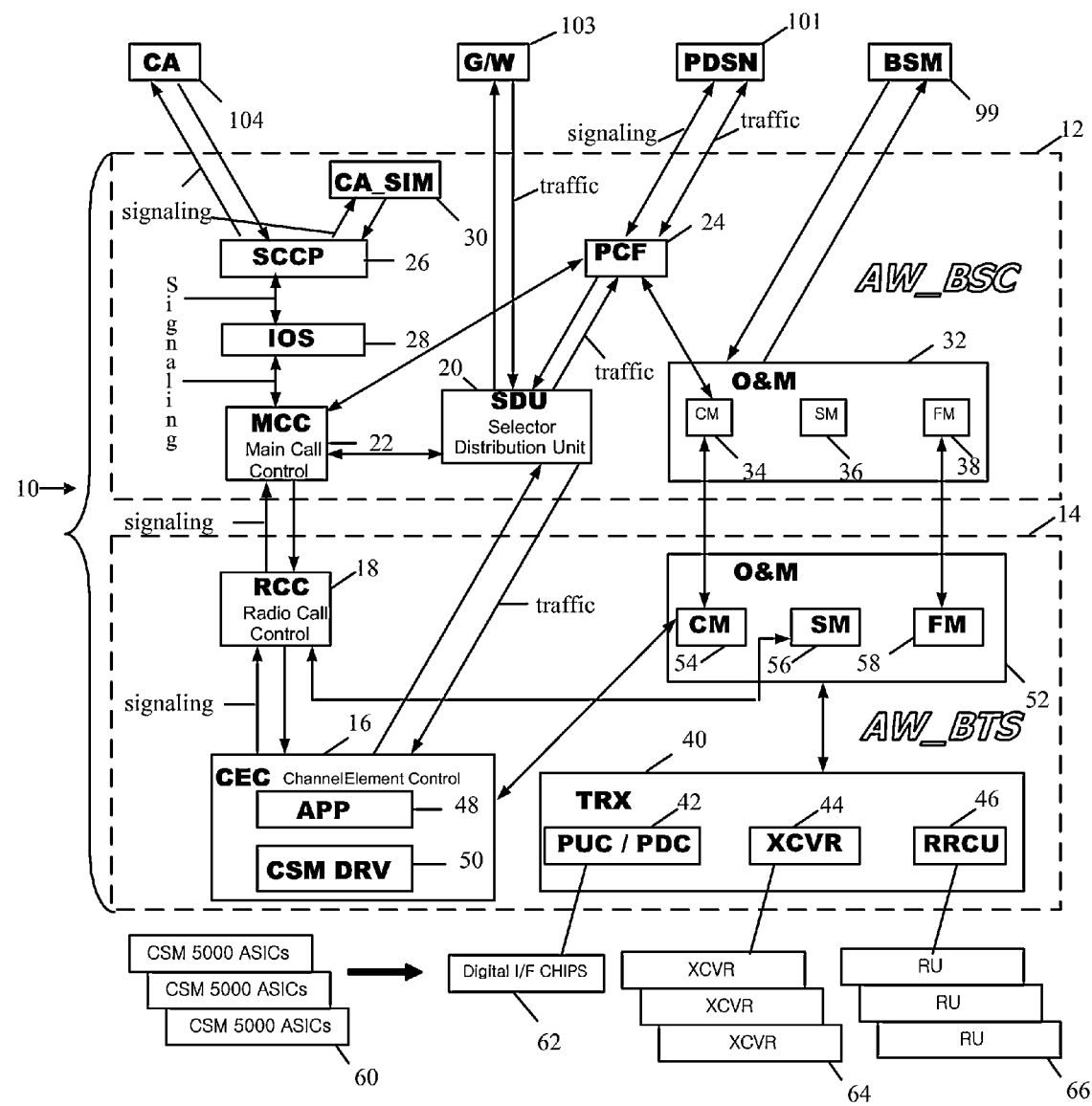
FIG. 1 depicts a radio access network (RAN) in accordance with a preferred embodiment of the present invention.

Referring now to FIG. 1, radio access network (RAN) 10 comprises a base station controller (BSC) 12 and a base transceiver station (BTS) 14 that comprise a number of blocks or modules. These blocks or modules are software, hardware, firmware, and/or a combination of software, hardware, and/or firmware. The BSC 12 comprises a selector distribution unit (SDU) 20 coupled to a main call control (MCC) 22 and to a packet control function (PCF) 24 which is also coupled to the MCC 22, a signaling control connection part (SCCP) 26 coupled to an interoperability system (IOS) 28 which is also coupled to the MCC 22, a call agent simulator (CA_SIM) 30 which is coupled to the SCCP 26, and an operation, administration, and maintenance (OA&M) 32 module coupled to the PCF 24.

Main Call Control (MCC) 22

The MCC 22, which performs the operations that pertain to individual subscribers including registration, call setup, call release, handoff and other subscriber features, is associated with the following functionality:

Registration

Mobile registration is a process where mobile characteristics such as location or status are provided to the network. Registration may be initiated by a mobile station (MS, not shown), by a network, or implied during access by the MS. To support these features, the MCC 22 interfaces with a radio call control module (RCC) 18, which will be described further below, and with a call agent (CA) 104. The CA 104 is preferably a soft switch whose functions include call processing, supplementary service, registration, interacts with a Home Location Register (HLR) in the macro network, and provides common PBX functions.

Mobile Originated Call Setup for Voice and Circuit Data Calls

The MCC 22 receives an Origination Message from the MS via the RCC 18 and then communicates with CA 104 to request call service, confirm the validity of the MS, as well as get the resource information from a media gateway (MG, not shown). The MG mediates the elements between circuit switched voice networks and an IP network. For example, the MG relays voice, fax, modem and data traffic over the IP network. The MCC 22 interfaces with the RCC 18 to request a radio resource and with the SDU 20 to allocate a selector resource.

Mobile Terminated Call Setup for Voice and Calls and Circuit Data Calls

The MCC 22 receives a Paging Request message from the CA 104 and passes it to the RCC 18 to initiate a mobile terminated call setup scenario. The MCC 22 receives a Page Response Message then communicates with the CA 104 to get the resource information from the MG and indicate for the call to be answered at the MS. The MCC 22 interfaces with the RCC 18 to request a radio resource and with the SDU 20 to allocate a selector resource.

Call Clearing of Voice and Circuit Data Calls

Call clearing may be initiated by either the MS, the SDU 20 or the CA 104. The MCC 22 sends clear messages to the SDU 20 or to the CA 104 and releases internal resources.

Mobile Originated Call Setup for Packet Data Calls

The MCC 22 receives an Origination Message from the MS via the RCC 18 with a data rate to send set to 'true' (DRS=1) and a packet data service option, and then communicates with the CA 104 to request packet data service and confirm the validity of the MS. The MCC 22 interfaces with the PCF 24 to setup a connection to a packet data serving node (PDSN) 101, which exchanges packets with the MS over the radio and the other IP networks, with the RCC 18 to requests a radio resource, and with the SDU 20 to allocate a selector resource.

Reactivation of Packet Data Calls

The MCC 22 supports either the MS initiated or network initiated reactivation from a dormant state. With a MS initiated reactivation, a normal packet data call setup procedure in the MCC ensues, while with a network initiated reactivation, the MCC 22 sends a base station (BS, not shown) Service Request to the CA 104 to begin an initiated call setup as a request from the PCF 24. The BS, which is a fixed station that communicates with the MS, may be a cell, a sector within a cell, a mobile switching center (MSC), or other part of the wireless system.

Call Clearing of Packet Data Calls

Call clearing may be initiated by either the MS, the SDU 20, the CA 104 or the PCF 24. During a call clearing scenario, the MCC 22 sends clear messages to the SDU 20, the CA 104 and the PCF 24 and releases internal resources.

Transition to Dormancy for Packet Data Calls

If the MS transits to a Dormant State, the MCC 22 proceeds in a normal packet call release scenario and notifies the CA while setting the release cause to "packet call going dormant." The MCC 22 also supports Dormant Handoff.

Short Data Bursts

The MCC 22 supports a Short Data Burst which consists of a small number of frames that are transmitted to a MS with a dormant packet data service instance.

Inter-BS Handoff

The MCC 22 supports soft handoff, inter-frequency assignment (FA) hard handoff and intra-FA hard handoff. The MCC 22 interfaces with the RCC 18 to get radio resources as request from the SDU 20 and manages neighbor lists.

Inter-CA Hard Handoff

When the MCC 22 receives a handoff request message from the SDU 20 and the handoff type is inter-CA hard handoff, the MCC 22 sends a Handoff Required message to the CA 104 to initiate an inter-CA hard handoff as a serving part. If the MCC 22 receives a Handoff Request message from the CA 104, the MCC 22 initiates an inter-CA hard handoff scenario as a target part.

Terminal Authentication

Terminal authentication is the process by which information is exchanged between the MS and the network to confirm the identity of the MS. The MCC 22 delivers relegated messages to the SDU 20, the RCC 18 and the CA 104.

Short Message Service

Short Message Service (SMS) is a mechanism of delivery of short messages over the mobile network. The MCC 22 supports messages and process for SMS mobile originated calls, SMS mobile terminated calls, and SMS Broadcast calls.

Supplementary Services

The MCC 22 supports various supplementary services including Message Waiting, Call Forwarding, Call Delivery, Call Transfer, Three Way Calling, and Conference Calling in terms of communicating with the RCC 18 using a Feature Notification Message or with the SDU 20 using Flash with an Information Message.

Test Calls

The MCC 22 initiates the test call process as a request from the base station manager (BSM 99) or on receiving an Origination Message with a look back service option from the MS.

Call Trace

The MCC 22 initiates the call trace process as a request from the WPM. The MCC 22 stores the related information to a buffer and starts a trace whenever the MS requests call service.

Selector Distribution Unit (SDU) 20

The SDU 20, which includes an air interface portion that processes air messages between the SDU and a MS, a router interface portion that processes messages between the SDU and other software blocks, and a portion that processes voice and data calls, is associated with the following functionality:

Multiplex and De-Multiplex

This function multiplexes and de-multiplexes user traffic and signaling traffic for the air interface.

Forward and Reverse Traffic Frame Selection and Distribution

This function is responsible for selecting the best quality incoming air interface reverse link frame involved in the soft handoff, and distributes forward air interface frames to all channel elements involved in a call.

Handoff Type Decision and Handoff Direction

This function decides a handoff type that will be processed including soft handoff, softer handoff, hard handoff, etc., and directs handoff processing to other software blocks such as the MCC 22 and a traffic channel element (TCE) in the CEC 16.

Process Radio Link Protocol (RLP) Procedures

A RLP Type 1, 2, and 3 is used with IS-95A/B or cdma2000 traffic channels to support CDMA data services. The RLP, which is a connection-oriented, negative-acknowledgement based data delivery protocol, provides an octet stream transport service over forward and reverse traffic channels. The RLP includes procedures to reduce the error rate exhibited by CDMA traffic channels.

Forward and Reverse Power Control

This function generates or utilizes relevant power control information that is exchanged over the air interface or the channel element.

Process Test Call Procedures

This function supports an MS loop-back call, such as a service option 2 and a service option 9 call.

Process Real Time Protocol (RTP) Procedures

This function is responsible for interfacing with a MG or other BSCs.

Process Signaling Layer 2 Procedures

This function performs the layer 2 functionality of the air interface signaling protocol and is responsible for the reliable delivery of the layer 3 signaling messages between the BSC and the MS.

Process Generic Routing Encapsulation (GRE) Procedures

This function is responsible for interfacing with the PDSN 101.

Media Gateway (G/W) 103

The SDU 20 receives data, formats it and then sends it to the G/W 103. Similarly, data received from the G/W 103 can be formatted by the SDU 20.

Signaling Control Connection Part (SCCP) 26

The SCCP 26 is used to provide a referencing mechanism to identify a particular transaction relating to, for instance, a particular call. The current implementation of the A1 interface using TCP/IP protocol employs an SCCP implementation which provides the minimal functionality required to create the CALL context in which to pass IOS messages and monitor the TCP/IP connection. The SCCP 26 is associated with the following functionality:

TCP/IP Connection Establishment

The SCCP creates a TCP/IP socket as a client to communicate with the CA 104.

Signaling Connection Establishment

A new transaction, such as location updating, or an incoming or outgoing call, is initiated on the radio path. Following an Access Request made by the MS on the access channel, the connection establishment is then initiated by the BS.

If the CA 104 decides to perform an inter-CA hard handoff, the connection establishment is initiated by the CA 104.

Signaling Connection Release

This procedure is normally initiated at the CA 104 but in the case of abnormal SCCP connection release, the BS may initiate a connection clearing.

Interoperability System (IOS) 28

The IOS 28 processes messages from the CA 104 or the MCC 22 and converts between internal message format and standard format. A Base Station Application Part (BSAP) is the application layer signaling protocol that provides messaging to accomplish the functions of the A1 Interface component of the CA—BS Interface. The BSAP is split into two sub-application parts: the BS Management Application Part (BSMAP), and the Direct Transfer Application Part (DTAP). The BSMAP supports all Radio Resource Management and Facility Management procedures between the CA 104 and the BS, or to a cell(s) within the BS. BSMAP messages are not passed to the MS, but are used to perform functions at the CA 104 or the BS. A BSMAP message (Complete Layer 3 Information) is also used together with a DTAP message to establish a connection for a MS between the BS and the CA 104, in response to the first layer 3 air interface message sent by the MS to the BS for each MS system request. The DTAP messages are used to transfer call processing and mobility management messages between the CA 104 and BS. DTAP messages carry information that is primarily used by the MS. The BS maps the DTAP messages going to and coming from the CA from/into the appropriate air interface signaling protocol.

The IOS 28 is associated with the following functionality:

Encoding Messages

The IOS messages proprietary format from the MCC 22 as the A interface specifications for sending to the CA.

Decoding Messages

The IOS 28 converts messages from the CA 104 to internal messages.

Packet Control Function (PCF) 24

The PCF 24 is a packet control function to manage the relay of packets between the BS and the PDSN 101. In a cdma2000 wireless network, access to packet data services is provided by the PDSN 101. The PCF 24 provides call processing functionality within the Radio Access Network (RAN) interfaces with the PDSN 101 and interfaces with the MCC 22 and the SDU 20 to provide internal signaling and packet delivery. The interface between the PCF 24 and the MCC 22 is called the A9 interface and the interface between the PCF 24 and the SDU 20 is the A8 interface. The interface between the PDSN 101 and the PCF 24, which is the interface between the radio and packet network, is known as the R-P interface or the A10/A11 interface.

The PCF 24 is associated with the following functionality: Main Processing which creates tasks and receives messages over IP, Message Processing which generates and extracts message by packing and unpacking, A10/A11 Processing which processes the A10/A11 interface, A8/A9 Processing which processes the A8/A9 interface, Hash Processing which performs the MD5 hashing function, Timer Processing which handles timer set, timer cancel, and timeout processing, Utility for primitives and debugging commands, and Call Control for call processing of originating, terminated and handoff calls.

Call Agent Simulator (CA_SIM) 30

For wireless voice and data communications, various components, such as the CA 104 in the core network and the IP-BS in the Radio-Access Network, are necessary components. The installation of other components in the core network, such as the CA 104, a HLR, etc., constitutes a large expense. To increase the efficiency and flexibility, a CA-simulator 30 can be provided so that voice and data calls are possible without connecting to the CA 104 or to an HLR. As such, an IP-BS can be installed in a small wireless network without a CA or HLR.

Operation, Administration and Maintenance (OAM) 32

The OAM block 32 is associated with the following functionality: a Configuration Management (CM) block 34 that configures each block or module of the BSC 12 based on program load data (PLD) information (which includes parameters, such as a system ID, an IP address, etc., to configure the system) which can be downloaded from a server, a Status Management (SM) block 36 that obtains a status of the BSC 12 and reports the status to the BSM 99, and a Fault Management (FM) block 38 that checks and detects system faults or alarms and reports them to the BSM.

Referring again to FIG. 1, the radio access network (RAN) 10 further comprises a base transceiver station (BTS) 14. The BTS 14 comprises a Channel Element Control (CEC) 16 coupled to the Radio Call Control (RCC) 18, an Operation, Administration and Maintenance (OAM) 52 block coupled to the CEC, to the RCC, and to a Transmit and Receive Interface (TRX) 40.

The Channel Element Control (CEC) 16

The CEC block 16 controls the call processing to interface with the MS. The CEC also interfaces with upper layer blocks to handle over the air messages to set-up, maintain, and terminate voice and data calls. In order to make these calls, both signaling and traffic frames must be transmitted and received to and from the MS. It is also important for these frames to be transmitted and received at the right time with correct information. This is accomplished by using, for example, a modem chip, such as the Qualcomm CSM5000 modem chip 60, I/F chips 62, a transceiver 64 and a power amplifier 66. The components 60-66 are predominantly hardware components that can be co-located within the RAN 10. The CEC block 16 is associated with the following functionality:

Overhead Channel Configurations

The CEC 16 receives overhead channel configuration messages from the RCM and sets the parameters to the driver of the modem chip 60.

Air Message Encapsulation and Transmission

The CEC 16 encapsulates and sends a frame for sync channel message transmission (at, for example, every 80 msec) and sends a frame for paging channel message transmission (at, for example, every 20 msec). To transmit each frame of the sync and paging channel, the CEC 16 revokes semaphores periodically by external interrupt request source.

CSM Built-In Test

The CEC 16 provides a built-in test function for the modem chip 60 which includes checking a register test, an interrupt test, as well as a reverse ARM test. This test can be performed by an operator's request to show if the modem chip 60 is functioning properly or not.

Forward and Reverse Power Control

The CEC 16 supports forward and reverse power control processing.

Process Time of Day (TOD) Message

The CEC 16 receives the TOD message via a GPS (at, for example, every 2 sec) and processes it to get the system time and GPS status.

Process Loopback Call Procedures

This function supports MS-BTS loop-back call, This function can show if air-interface between MS and BTS works well.

Process Traffic Channel Processing

The CEC 16 is responsible for assigning a traffic channel and clearing it by the order of RCC 18. When the traffic channel is setup, the CEC 16 delivers traffic packets between the SDU 20 and the MS.

Maintain Forward and Reverse Link

The CEC 16 checks the forward and reverse path and reports them to a status or statistics block.

Process High Speed Data Service

The CEC 16 is responsible for processing supplemental channel (SCH) packets for high speed data service which supports up to, for example, 128 kbps. The SCH packets are used if additional channels are needed to handle the transfer of the data.

Process Soft and Softer Handoff Procedure

The CEC 16 is responsible for processing Soft and Softer Handoffs.

Provide H/W Characteristics Test Functionalities

The CEC 16 supports various hardware characteristics tests such as an access probe test, a AWGN test, etc. Theses tests determine if the RF or the IF properties of each of the basestations are in order to ensure (via, for example, a good path) that messages can be transferred.

The CSM application 48 is adapted to receive data from the CSM (or modem chip 60) Driver 50.

Radio Call Control (RCC) 18

The call control of the air interface is provided by the RCC 18. The air interface between the MS and the BTS 14 is specified by, for example, the TIA/EIA-95-A/B and the cdma2000 standards, which include the core air interface, minimum performance, and service standards. The functionalities of the RCC 18 consist of call processing, resource management, and supplementary services. The RCC 18 provides call processing functionality in order to setup and release call and resource management of radio resources such as CDMA channels, traffic channel elements, Walsh code channels, frame offsets, etc. The RCC 18 also provides signaling functionality by interfacing with other relevant software blocks.

The RCC 18 provides various processing functions including: Main Processing which creates tasks and receives messages over IP, Resource Management which processes resource allocation and de-allocation, Message Processing which generates and extracts message by packing and unpacking, Initialization Processing which initializes buffers and variables, RCV. from RSCH processing which processes all messages on the reverse common signaling channel, RCV. from RDCH processing which processes some messages on the reverse dedicated signaling channel, RCV. from MCC processing which processes all messages from the MCC, SND. to FSCH processing which processes all messages sent to MS on the forward common signaling channel, SND. to FDCH processing which processes some messages sent to MS and CEC on forward dedicated signaling channel, SND. to MCC processing which processes all messages sent to the MCC, Layer 2 Processing which processes Layer 2 information, Hash Processing which performs the hash function to decide CDMA channel and Paging Channel number, Timer Processing which handles timer set, timer cancel, and timeout processing, and Utility which provides primitives and debugging commands.

Transmit and Receive Interface (TRX) 40

The TRX block 40 controls and diagnoses hardware devices in the BTS 14, and includes:

The PUC/PDC Block 42

The PUC/PDC 42 up-converts and down-converts between a baseband signal and an IF signal.

The Transceiver Control (XCVR) Block 44

The Transceiver Control Block (XCVR) 44 controls transceiver operations which carry IF signals to a carrier frequency band.

AMP Control Block

For high power amplification of the signal, the IP-BS provides the interface to the AMP. The AMP control block controls AMP operations such as ON/OFF.

Hardware Diagnostic Test Module

The diagnostic test module provides the functionalities for hardware characteristics test of pn3383 such as AWGN test, access probe test, etc. For example, the pn3383 test implements test environment conditions.

The power amplifier (PA) 66, via the RRCU 46, amplifies the output signal because the output of the XCVR 44 tends to be small. As such, a broader coverage area is possible.

Operation, Administration and Maintenance (OAM) Block 52

The OAM block 32 is associated with the following functionality: a Configuration Management (CM) block 34 that configures each block or module of the BTS 14 based on program load data (PLD) information (which includes parameters, such as a system ID, an IP address, etc., to configure the system) received from the BSM (or IP-BS) 99, a Status Management (SM) block 36 that obtains a status of the BTS 14 and reports the status to the BSM, and a Fault Management (FM) block 38 that checks and detects system faults or alarms and reports them to the BSM.

Figure 2:
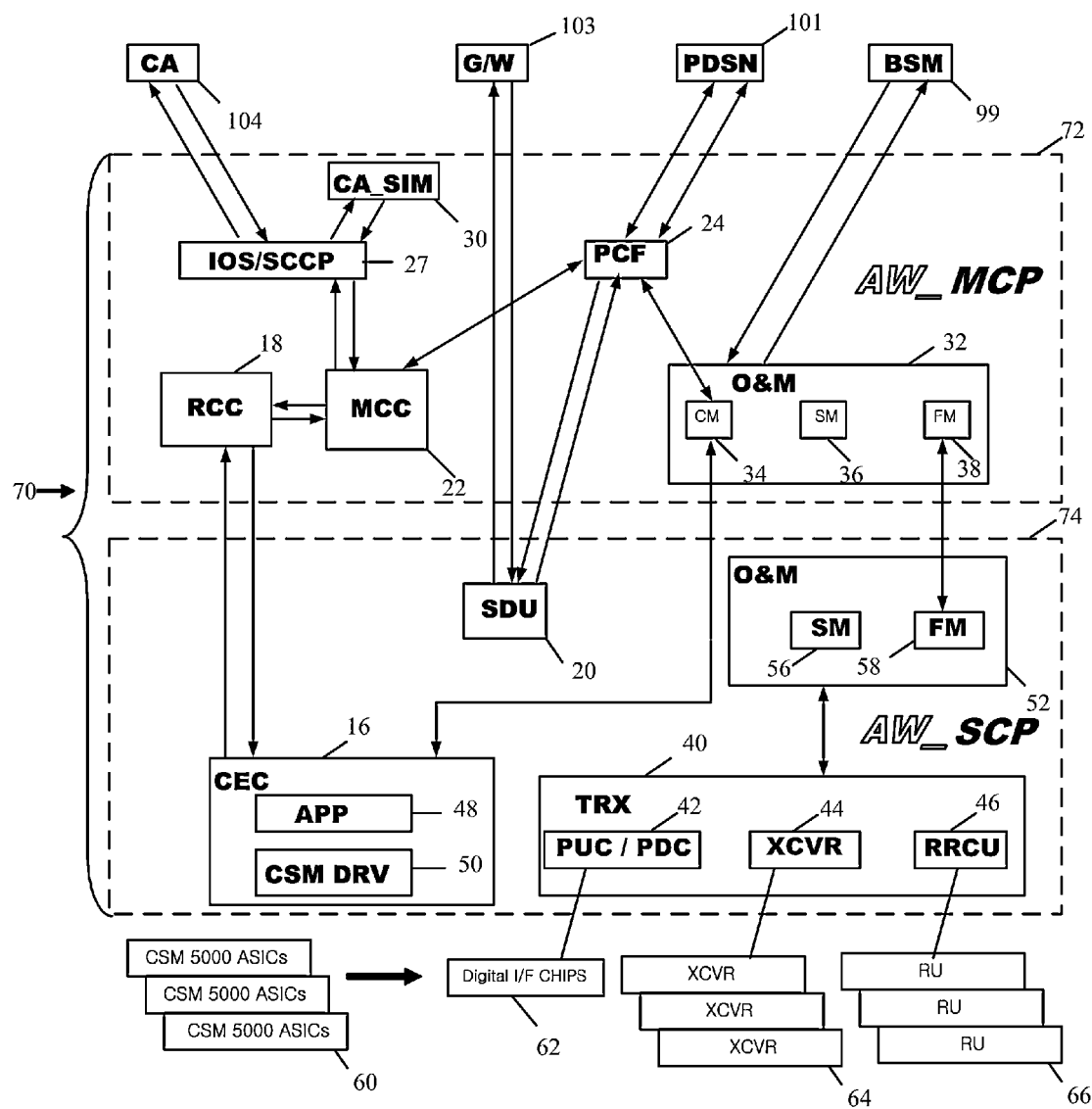
FIG. 2 depicts a stackable RAN in accordance with a preferred embodiment of the present invention.

Referring now to FIG. 2, the components of a stackable IP Radio Access Network (RAN) 70 are depicted. The blocks in the RAN 70 perform a similar functionality to their respective blocks in the RAN 10. Such a stackable RAN 70 provides increased bandwidth and redundancy without utilizing a card based expansion scheme as has been previously employed. Rather, the RAN 70 is modular and stackable (in a very small footprint) and includes a control portion (the Main Control Processor (MCP)) 72 and a device portion (the SDU/CEC Processor (SCP)) 74. With a centralized control portion 72, various device portions 74 can be utilized with a single control portion.

A difference between the RAN 70 and the RAN 10 is that the SDU 20 is now co-located with the CEC 16, and the RCC 18 is co-located with the MCC 22. As such, messaging between these co-located blocks is decreased providing an increase in system performance.

Figure 3:
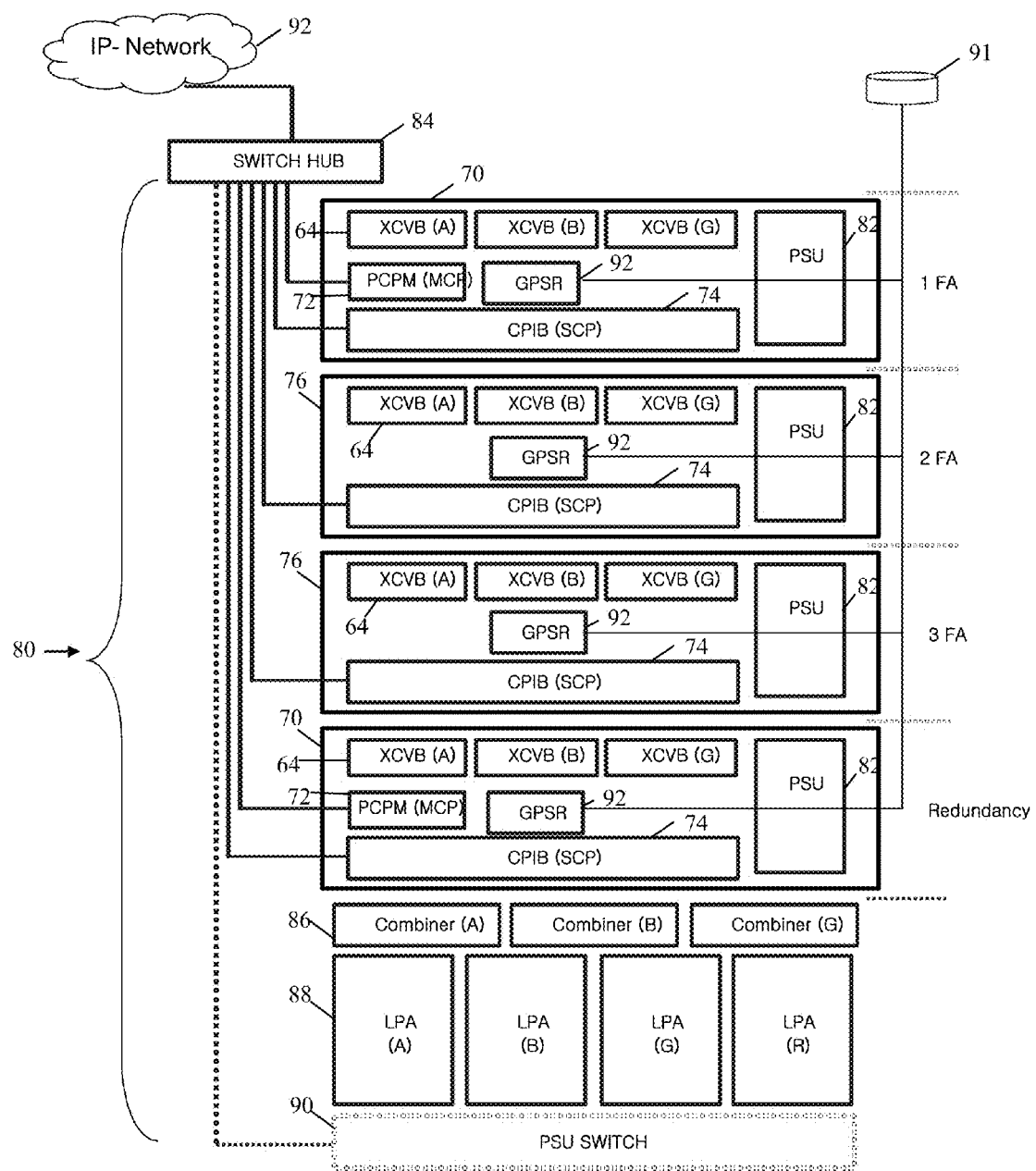
FIG. 3 depicts a further stackable RAN in accordance with a preferred embodiment of the present invention.

Referring now to FIG. 3, a stackable configuration 80 of the RAN of the present invention is depicted. The configuration 80 includes a RAN 70 that includes a master MCP 72 and a RAN 70' that includes a slave MCP 72. The master and slave MCPs preferably have the same IP address for redundancy. If the master MCP fails, a seamless transition to the slave MCP occurs. Backhaul timing is a limited issue because information is transferred between a BTS and a BSC in one "box" and not across a longer distance as with a typical network. The configuration 80 further includes RANs 76 which do not contain an MCP but rather, are controlled by the master MCP 72 in RAN 70. Each of the RANs depicted 70, 70', and 76 include at least one transceiver 64, power supply 82, and GPS receiver 92 that synchronizes the timing between the BSC 12 and the BTS 14 and between the MCP 72 and the SCP 74 per information received from a database 91 and/or GPS related satellites.

The configuration 80 may also include a combiner 86 that may combine a plurality of frequency segments to a common transmission line or antenna, a power amplifier 88 (which is similar to power amplifier 66), and a power supply 90 that could be used to re-set or re-start the RANs 70, 70', and 76. A switch hub 84 may be included to provide a single access (via, for example, an IP address), between the configuration 80 and the IP network 92.

Figure 4:
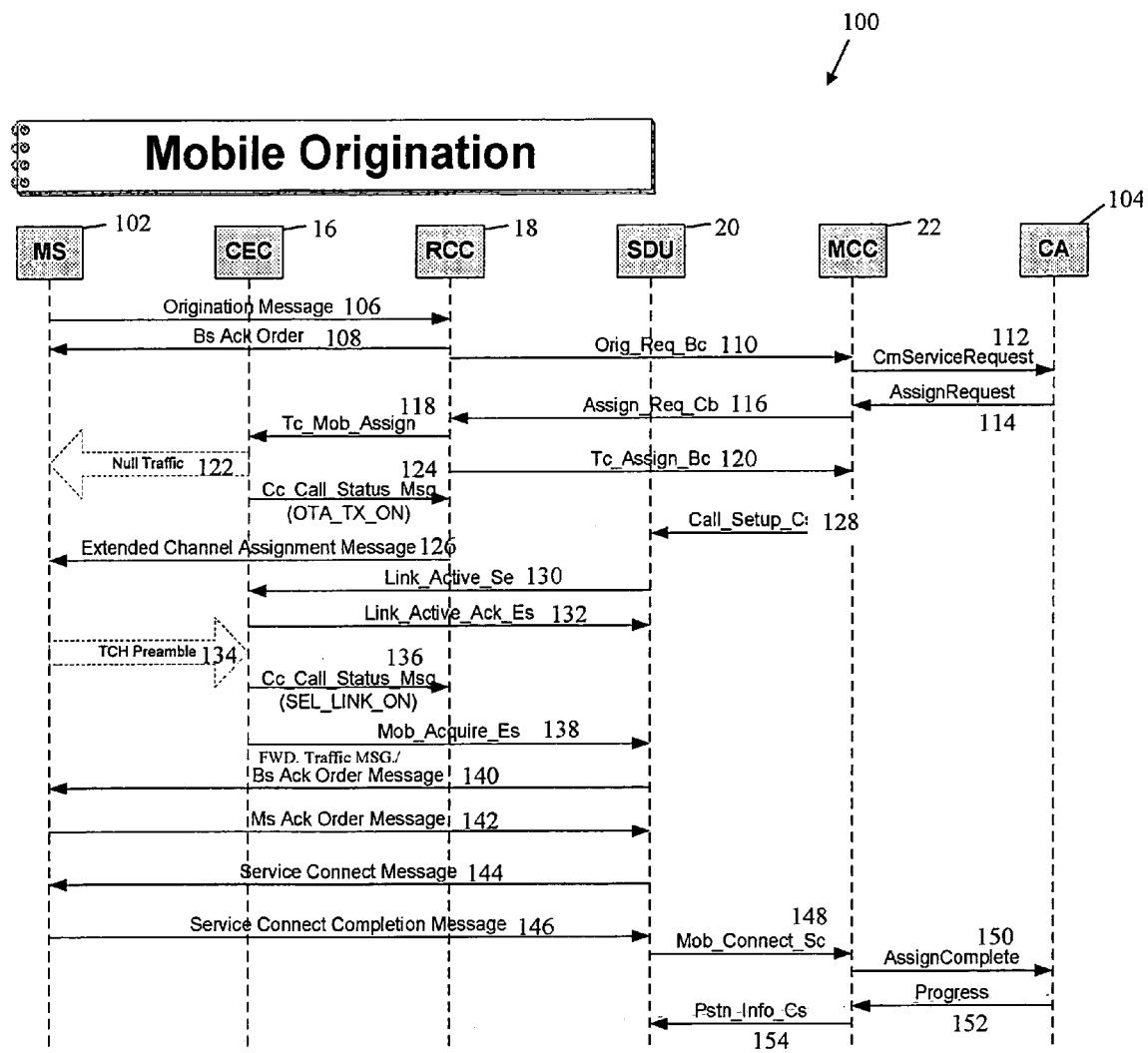
FIG. 4 depicts a mobile origination message flow in accordance with a preferred embodiment of the present invention.

Referring now to FIG. 4, a mobile origination message flow 100 is depicted. The RCC 18 receives an Origination message 106 from the MS 102 through the CEC 16 with access information, the MS identification, service option, and other call related information. The RCC 18 unpacks the message 106 and stores significant call related information for further processing, and sends a Base Station Acknowledgement message 108 to the MS 102 and an origination message 110 to the MCC 22 with the MS identification information.

The MCC 22 constructs the CM Service Request message 112 (based on the IS-2001-B specification), places it in the Complete Layer 3 Information message, and sends the message to the CA 104. The MCC 22 receives an Assignment Request message 114 from the CA 104 and allocates the SDU ID, IP address and port number for the A2 (RTP) interface and sends an Assignment Request message 116 to the RCC 18 to request an assignment of radio resources. This message 116 includes information on the SDU 20, resource information for A.sub.bis interface, Service Option, the MS identification, etc.

Upon receiving Assignment Request Message 116 from the MCC 22, the RCC 18 allocates radio resources and then sends a Traffic Channel Assign message 118 with assign type (=NEW) to the CEC 16 in order to assign Forward and Reverse Traffic Channel Elements. The RCC 18 sends the Traffic Channel Assign message 120 with traffic channel allocation information to the MCC 22. When the CEC 16 receives Tc_Mobile_Assign message 118 from the RRC 18, it sets CSM driver with the parameters in the message to activate the CSM ASICs to prepare call setup. The CEC 16 sends null traffic frame 122 to the Mobile Station 102 and a OTA_TX_ON message 124 (that CEC 16 is sending null frame to MS 102) to the RCC 18. The RCC 18 makes and sends an Extended Channel Assignment Message 126 to the MS 102 through the CEC 16.

After receiving the TC assign message from the RCC 18 with the result of ASSIN_OK or ASSIGN_ALTERNATIVE, the MCC 22 sends a Call_Setup_Cs message 128 to the SDU 20 with the information on the MS 102 as well as the BTS resource to SDU 20 for initialization. The SDU 20 receives the Call_Setup_Cs message 128 that is sent from the MCC 22 to request for selector initialization, and sends a Link_Active_Se message 130 with SDU 20 resource information to the CEC 16. When the CEC 16 receives the Link_Active_Se message 130 from the SDU 20, the CEC 16 assumes that the link between the CEC 16 and the SDU 20 has been established and sends a Link_Act_Ack_Es message 312 to the SDU 20 to acknowledge the receipt of the Link_Active_Se message 130.

Upon acquiring the signal 134 of the MS 102, the CEC 16 sends a SEL_LINK_ON message 136 which indicates Call setup is complete to the RCC 18, which updates the call state with Active (BUSY). When the CEC 16 acquires the signal of the MS 102, it sends a Mob_Acquire_Es message 138 to the SDU 20, which indicates the reverse traffic channel has been established. Once the SDU 20 acquires the reverse traffic channel, it sends a Forward Traffic message 140, including a Base Station Acknowledgement Order with layer 2 acknowledgement required, to the MS 102 over the forward traffic channel.

Upon receiving an Ack Order Message 142 from the MS, the SDU 20 sends a Service Connect Message 144 with layer 2 acknowledgement required to the MS 102 over the forward traffic channel. The SDU 20 receives a Service Connect Completion message 146 from the MS 102 and then sends a Mobile Connect message 148 to the MCC 22 to indicate the MS 102 connection. The MCC 22 sends an Assignment Complete message 150 to the CA 104 and it may include SDU 20 resource information for the A2 interface. The MCC 22 may receive a Progress message 152 from the CA 104 including a destination IP address and port number for the A2 interface and a Pstn_Info_Cs message 154 is sent to the SDU 20. The SDU 20 receives the Pstn_Info_Cs message 154 with the PSTN connect information and starts traffic packet processing for conversation.

Figure 5:
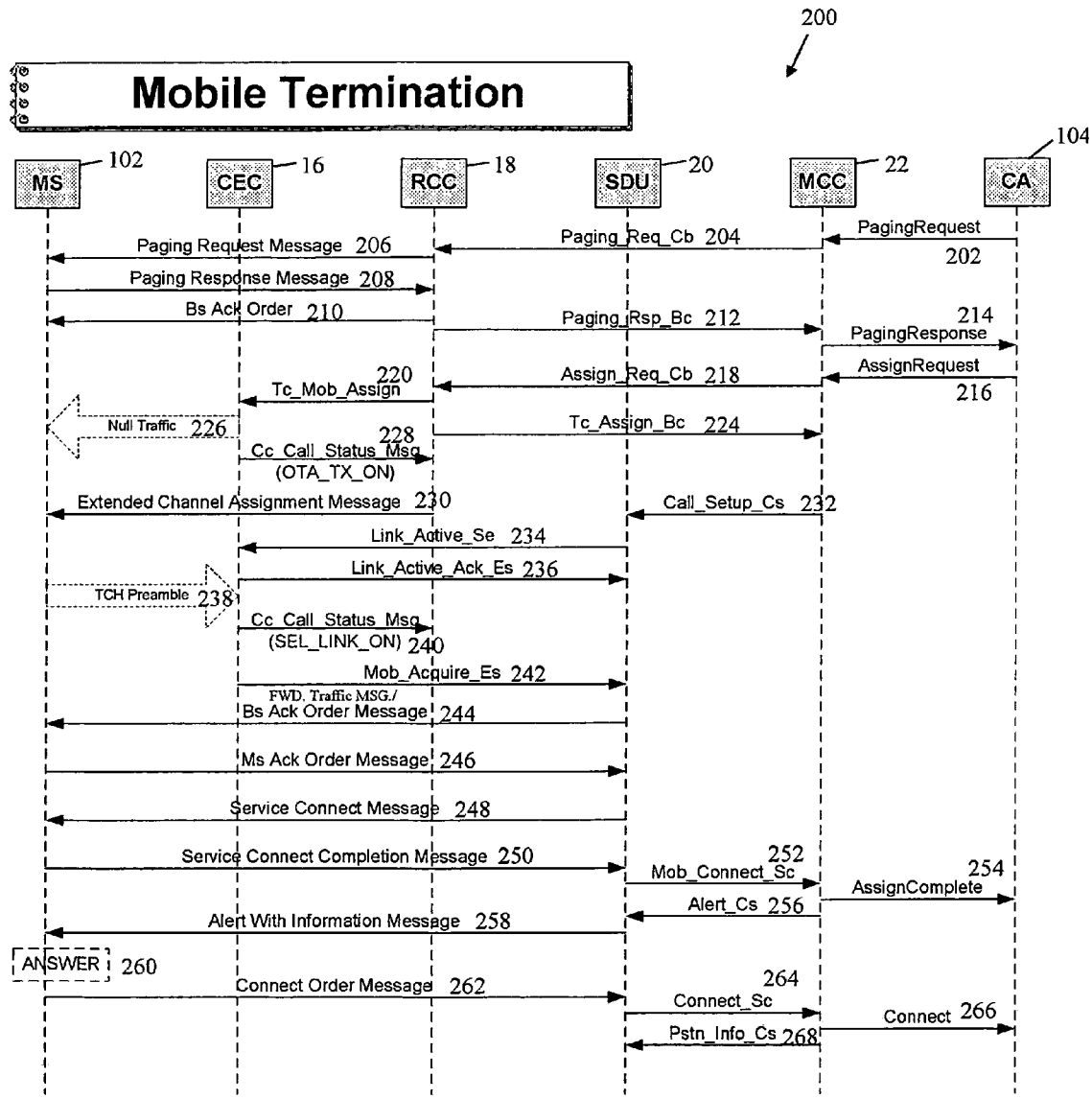
FIG. 5 depicts a mobile termination message flow in accordance with a preferred embodiment of the present invention.

Referring now to FIG. 5, a mobile termination message flow 200 is depicted. The MCC 22 receives a Paging Request message 202 from the CA 104 and sends a Paging Request message 204 to the RCC 18. The RCC 18 receives the paging request from the MCC 22 with MSID information and tags and stores them for further processing. The RCC 18 determines paged frequency assignment (FA) by using the Hash Function with MSID information, and sends a General Page message 206 to the MS 102 through the CEC 16.

The RCC 18 receives a Page Response message 208 from the MS 102 through the CEC 16 (with access information, the MS identification, service option, and other call related information), unpacks the message and stores significant call related information for further processing, and sends a Base Station Acknowledgement message 210 to the MS 102. The RCC 18 sends a page response message 212 with the MS identification information and specified tag to the MCC 22, which constructs a Page Response message 214 based on the IS-2001-B specification, places it in a Complete Layer 3 Information message, and sends the message to the CA 104.

The MCC 22 receives an Assignment Request message 216 from the CA 104 which may include a destination IP address and port number for the A2 interface. The MCC 22 allocates a SDU ID, IP address and port number for the A2 (RTP) interface, sends an Assignment Request message 218 to the RCC 18 to request an assignment of radio resources. This message includes information on the SDU 20 resource information for A.sub.bis interface, Service Option, MS identification, etc. After receiving the Assignment Request message 218 from the MCC 22, the RCC 18 allocates radio resources and then sends a Traffic Channel Assign message 220 with assign type (=NEW) to the CEC 16 in order to assign Forward and Reverse Traffic Channel Elements. The RCC 18 sends a TC assign message 224 with traffic channel allocation information to the MCC 22.

When the CEC 16 receives the Tc_Mobile_Assign message 220 from the RCC 18, it sets a CSM driver with the parameters in the message to activate the CSM ASICs to prepare call setup. The CEC 16 sends a null traffic frame 226 to the MS 102 and sends a OTA_TX_ON message 228 (that indicates the CEC 16 is sending null frame to the MS 102) to the RCC 18. The RCC 18 makes and sends an Extended Channel Assignment message 230 to the MS 102 through the CEC 16. After receiving the TC assign message from the RCC 18 with the result of ASSIN_OK or ASSIGN_ALTERNATIVE, the MCC 22 sends a Call_Setup_Cs message 232 with the information on the MS 102 as well as a BTS resource to the SDU 20 for initialization.

The SDU 20 receives a Call_Setup_Cs message that is sent from the MCC 22 to request selector initialization. The SDU 20 sends a Link_Active_Se message 234 with the SDU 20 resource information to the CEC 16, which assumes that the link between the CEC 16 and the SDU 20 has been established and sends a Link_Act_Ack_Es message 236 to the SDU 20 to acknowledge the receipt of the Link_Active_Se message 234. Upon acquiring the signal 238 of the MS 102, the CEC 16 sends a SEL_LINK_ON message 240 which indicates Call setup is completed to the RCC 18. The RCC 18 updates call state with Active (BUSY), and the CEC 16 sends a Mob_Acquire_Es message 242 to the SDU 20, which means the reverse traffic channel established. Once the SDU 20 acquires the reverse traffic channel, it sends a Forward Traffic message 244 including a Base Station Acknowledgement Order with layer 2 acknowledgement required, to the MS 102 over the forward traffic channel. Upon receiving the MS 102 Ack Order message 246 from the MS 102, the SDU 20 sends a Service Connect message 248 with layer 2 acknowledgement required to the MS 102 over the forward traffic channel.

The SDU 20 receives a Service Connect Completion message 250 that is sent from the MS 102 and then sends a Mobile Connect message 252 to the MCC 22 to indicate the MS 102 connection. The MCC 22 sends an Assignment Complete message 254 to the CA 104, which may include the SDU 20 resource information for the A2 interface. An Alert Message 256 is sent from the MCC 22 to cause ringing at the MS 102. The SDU 20 sends an Alert With Information message 258 to the MS 102 to cause ringing at the MS 102. This message is sent by the SDU 20 to the Traffic Channel in the Forward Traffic message. When the call is answered 260 at the MS 102, a Connect Order 262 with acknowledgment required is transmitted to the SDU 20 through the CEC 16 (reverse traffic channel). The SDU 20 sends a Connect_Sc message 264 to the MCC 22 to acknowledge a connection between the SDU 20 and the MS 102. The MCC 22 sends a Connect message 266 to the CA 104 and a Pstn_Info_Cs message 268 to the SDU 20 with the PSTN connect information and starts traffic packet processing for conversation.

Figure 6A:
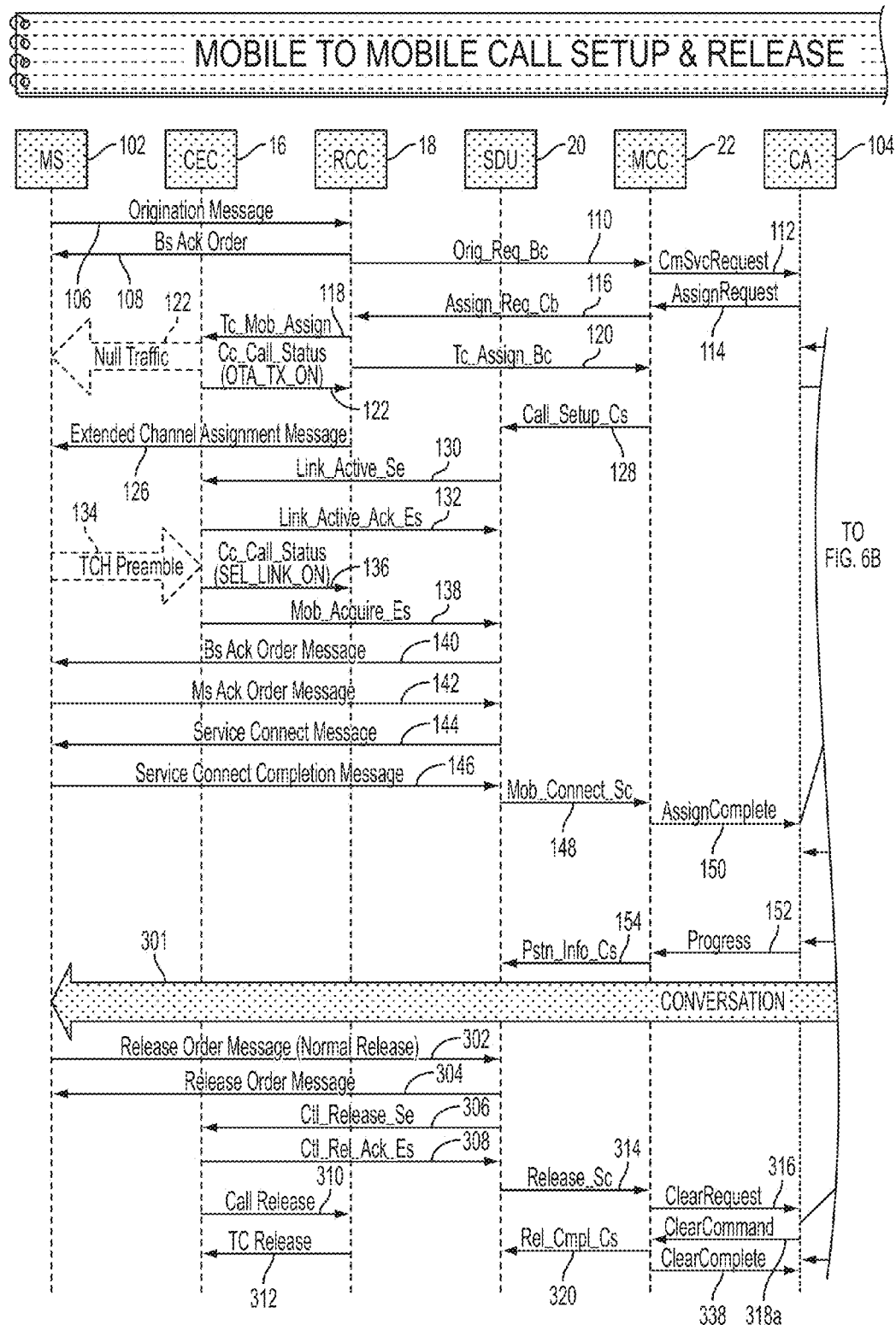
FIGS. 6A and 6B depicts a mobile to mobile call setup and release message flow in accordance with a preferred embodiment of the present invention.
Figure 6B:
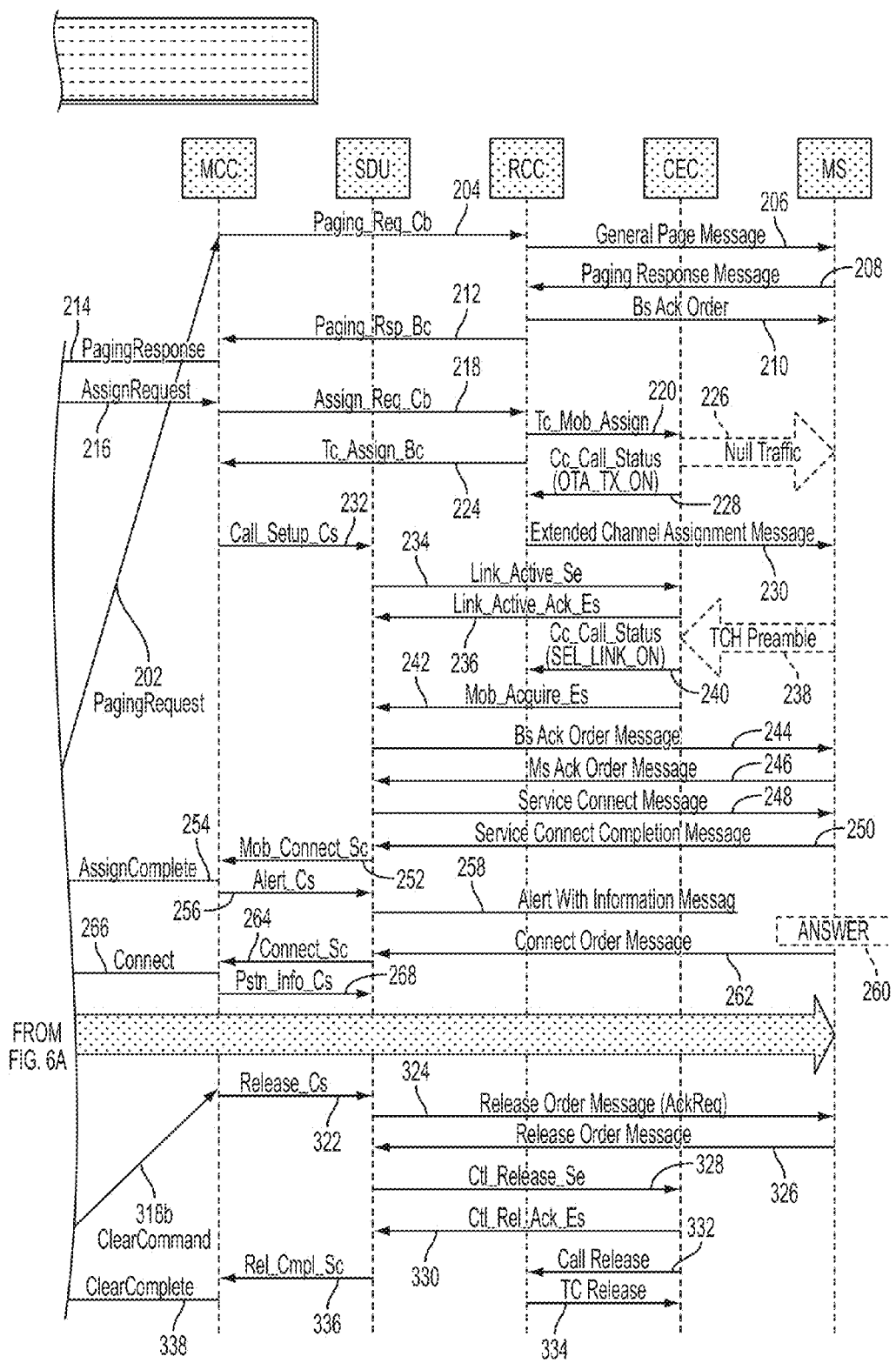

Referring now to FIGS. 6A and 6B, a mobile to mobile call setup and release message flow 300 is depicted. The messaging 106-268 as described in FIGS. 4 and 5 leads to a Conversation State 301. The MS 102 initiates a call clearing by transmitting a Release Order message 302 over the reverse traffic channel. The SDU 20 acknowledges the MS 102 by sending a Release Order message 304 over the forward traffic channel.

The SDU 20 sends a forward control message containing the Release Order message 304 to release the call in BTS. This message may be retransmitted a number of times. When the CEC 16 receives a Ctl_Release_Se message 306 from the SDU 20, it responds 308 that call release was successfully performed. The CEC 16 stops the forward and reserves traffic service and sends a Release message 310 to the RCC 18 in order to request a release traffic channel. The RCC 18 receives a Call Release message from the CEC 16 and releases the originated call. The RCC 18 de-allocates all the resources and initializes the resource buffer and call buffer related to the call. The RCC 18 sends a Release message 312 to the CEC 16 to initialize the specified Forward and Reverse Traffic Channel Elements.

Upon receiving the TC Release message 312 from the RCC 18, the CEC 16 shuts down traffic channel operations. When a Ctl_Rel_Ack_Es message for response from the CEC 16 is received, the SDU 20 sends a Release message 314 to the MCC 22 to request the call to be released in the BSC. The MCC 22 requests a call release 316 to the CA 104 which orders the call release by sending Clear Command messages 318a-318b to the MCC 22. The MCC 22 of the origination side sends a Rel_Cmpl_Cs message 320 to the SDU 20 to acknowledge the call release, and the MCC 22 of the termination side sends a Relealse_Cs message 322 to the MCC 22 to request the call release of the terminated call. Upon receiving the Release Completion message from the MCC 22, the SDU 20 stops all processing for this call 338.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the modules RANs 70, 70', and 76, and/or by one or more of the blocks 16-58. Also, these capabilities may be performed in the current manner or in a distributed manner and on, or via, any device able to transfer information between the RANs, the blocks, and/or other components. Further, although depicted in a particular manner, various blocks may be repositioned without departing from the scope of the current invention. For example, the RCC 18 may be positioned in the BSC 12, while the SDU 20 may be positioned in the BTS 14. Still further, although depicted in a particular manner, a greater or lesser number of RANs and/or blocks may be utilized without departing from the scope of the current invention. For example, additional RANs 76 may be utilized in the configuration 80 of the present invention.

Further, a lesser or greater number of messages may be utilized with the present invention and such messages may include complementary information in order to accomplish the present invention, to provide additional features to the present invention, and/or to make the present invention more efficient. Also, various timers may be employed by the present invention. For example, in the case of the mobile termination message flow, when the MCC 22 constructs the Page Response message 214 based on the IS-2001-B specification, places it in the Complete Layer 3 Information message, and sends the message to the CA 104, it may further start timer T.sub.303. Then, when the MCC 22 receives an Assignment Request message 216 from the CA 104, it may stop the T.sub.303 timer.

What is claimed is:

1. A method, comprising:
   receiving an origination request message by a main call control (MCC) from a radio call control (RCC), the origination request message originating from a mobile station and being forwarded via the RCC to the MCC;
   receiving a traffic channel assign message by a channel element control (CEC) and by the MCC from the RCC, wherein the assign message includes a request for an assignment of radio resources;
   receiving a call setup message by a selector distribution unit (SDU) from the MCC;
   receiving a mobile station signal at the CEC;
   transmitting a call setup complete message to the RCC responsive to receiving the mobile station signal;
   transmitting, via the SDU, a forward traffic message comprising a base station acknowledgment order to the mobile station over a forward traffic channel; and
   receiving a service connect completion message at the SDU from the mobile station.

2. The method of claim 1 comprising receiving a mobile acquire message by the SDU from the CEC.

3. The method of claim 1, wherein the MCC and the RCC located in a Main Control Processor.

4. The method of claim 1 comprising sending a service connect message from the SDU to the mobile.

5. The method of claim 1 comprising receiving a mobile connect message by the MCC from the SDU.

6. The method of claim 1 comprising receiving a PSTN information message by the SDU from the MCC.

7. The method of claim 1, wherein the origination request message comprises identification information of the mobile station.

8. The method of claim 1, wherein the CEC and the MCC are included in at least one of a base station controller and a base transceiver station.

9. The method of claim 1, wherein the traffic channel assign message received by the CEC assigns forward and reverse traffic channel elements.

10. The method of claim 1, wherein the traffic channel assign message received by the MCC includes traffic channel allocation information.

11. The method of claim 1, wherein the call setup message received by the SDU includes information related to the mobile and to initialization information.

12. The method of claim 1, further comprising receiving a link active message by the CEC from the SDU, wherein the link active message received by the CEC indicates a link between the CEC and the SDU has been established.

13. The method of claim 2, wherein the mobile acquire message received by the SDU occurs when the CEC acquires the signal of the mobile and indicates the reverse traffic channel has been established.

14. The method of claim 3, wherein the forward traffic message sent from the SDU comprises a layer 2 acknowledgement over a forward traffic channel.

15. The method of claim 5, wherein the mobile connect message received by the MCC indicates a connection of the mobile.

16. The method of claim 1, further comprising receiving PSTN information by the SDU, wherein the PSTN information message received by the SDU includes PSTN connect information and starts traffic packet processing for conversation.

17. The method of claim 1 comprising receiving a link active message by the CEC from the SDU, the CEC and the SDU located in a SDU/CEC Processor (SCP).

18. The method of claim 1 comprising receiving an assignment request message by the RCC from the MCC.

19. A non-transitory computer readable storage medium comprising instructions for:
   receiving an origination request message by a main call control (MCC) from a radio call control (RCC), the origination request message originating from a mobile station and being forwarded via the RCC to the MCC;
   receiving a traffic channel assign message by a channel element control (CEC) and by the MCC from the RCC;
   receiving a call setup message by a selector distribution unit (SDU) from the MCC;
   receiving a mobile station signal at the CEC;
   transmitting a call setup complete message to the RCC responsive to receiving the mobile station signal;
   transmitting via the SDU a forward traffic message comprising a base station acknowledgment order to the mobile station over a forward traffic channel; and
   receiving a service connect completion message at the SDU from the mobile station.

20. A system, comprising:
   a main call control (MCC) located in a Main Control Processor (MCP) adapted to receive an origination request message, the origination request message originating from a mobile station and being forwarded via an radio call control (RCC) to the MCC;

at least one channel element control (CEC) and a main call control (MCC) adapted to receive a traffic channel assign message; and at least one selector distribution unit (SDU) adapted to receive a call setup message;

wherein the CEC is adapted to receive a mobile station signal, wherein the CEC is adapted to transmit a call setup complete message to the RCC responsive to receiving the mobile station signal, wherein the SDU is adapted to transmit a forward traffic message comprising a base station acknowledgment order to the mobile station over a forward traffic channel, and wherein the SDU is adapted to receive a service connect completion message from the mobile station.

* * * * *